April 14, 1942.    R. E. HARTLINE    2,279,397
COMBUSTIBLE GAS INDICATOR
Filed Dec. 19, 1939    2 Sheets-Sheet 1

INVENTOR.
Ralph E. Hartline
BY Brown, Critchlow & Flick
his ATTORNEYS.

WITNESSES
AB Wallace
Fulton B. Flick

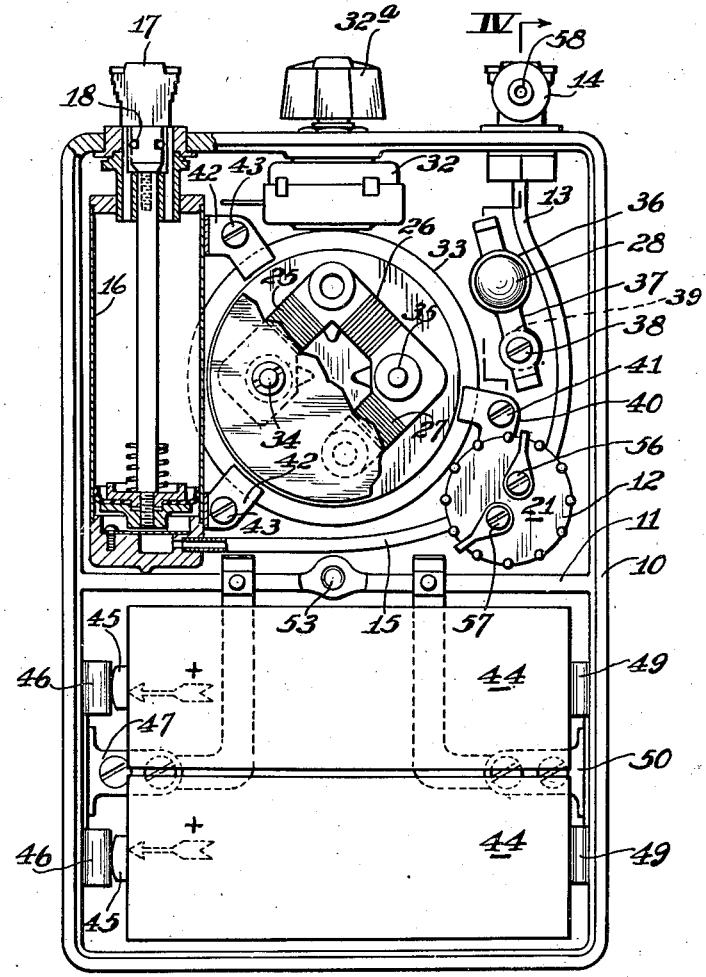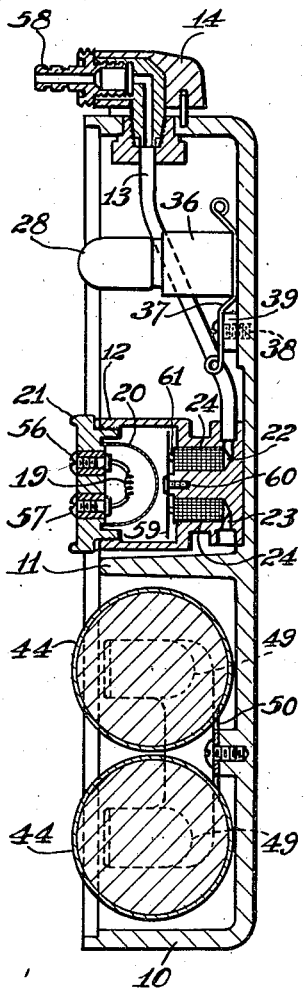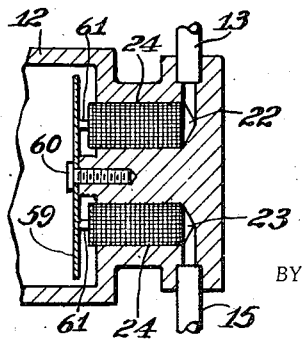

Patented Apr. 14, 1942

2,279,397

UNITED STATES PATENT OFFICE 2,279,397

COMBUSTIBLE GAS INDICATOR

Ralph E. Hartline, Swissvale, Pa., assignor to Mine Safety Appliances Company, Pittsburgh, Pa., a corporation of Pennsylvania Application December 19, 1939, Serial No. 310,050

5 Claims. (Cl. 23—255)

This invention relates to the testing of gases to ascertain the presence and amount, either or both, of combustible constituents thereof by passing the gas into contact with a heated filament which causes combustion of combustible constituents present, and using the change in resistance of the filament caused by such combustion to indicate the result.

An object of the invetnion is to provide an improved gas testing method and apparatus of the general type referred to which provide adequate sensitivity with small current consumption, operate with small, light batteries, are simple and readily used, afford improved battery life as compared with the procedures and apparatus available heretofore, and in the use of which adjustment of the filament voltage and the zero setting may be obtained together.

A further object is to provide an improved Wheatstone bridge circuit for gas testing apparatus in which a controlled degree of bridge instability is deliberately used whereby to permit operation of the apparatus by a single control rheostat.

Another object is to provide apparatus embodying the method which is inexpensive to make in highly compact, light and readily portable form.

Another object is to provide an improved flow system for the combustion cell of apparatus of the general type to which reference has been made.

Other objects will be understood from the following description.

Figure 6:
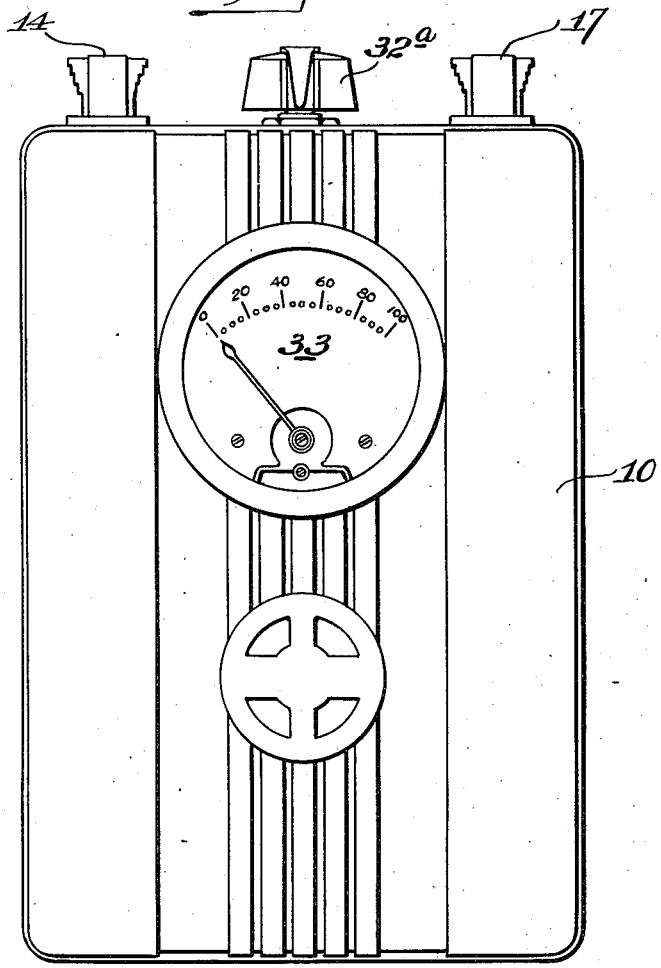
Figure 5:
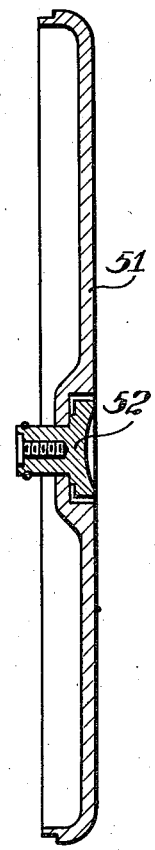
Figure 3:
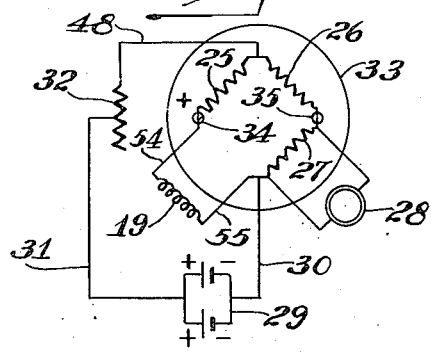
Figure 1:
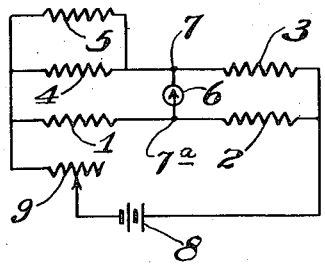

The invention will be described with reference to the accompanying drawings in which Fig. 1 is a wiring diagram illustrative of one embodiment of the invention; Fig. 2 a vertical rear elevation, partly in section, of the preferred embodiment, the cover being removed and the wiring omitted for simplicity of representation; Fig. 3 a wiring diagram of the apparatus shown in Fig. 2; Fig. 4 a longitudinal sectional view through the apparatus taken on line IV—IV of Fig. 2; Fig. 5 a longitudinal sectional view through the rear cover of the apparatus shown in Fig. 2; Fig. 6 a front view of the apparatus; and Fig. 7 a detail, on an enlarged scale, of the combustion cell shown in Fig. 4.

Combustible gas indicators of the type in which gas to be tested is passed into contact with a heated filament take a variety of forms. For example, in one embodiment the heated filament is made one arm of a simple Wheatstone bridge circuit. In more advanced forms of such apparatus a Wheatstone bridge circuit includes in addition to a testing filament a compensator element the purpose of which is to stabilize the electrical circuit against variations arising from changes of the applied bridge potential so that it can be balanced readily, will remain in balance for adequate periods of time, and so that the voltage of the testing filament can be adjusted appropriately, as is well understood by those skilled in the art. This latter type of apparatus may also assume a variety of forms; for example, the testing filament may be catalytically active and the compensating element may be an electrically similar filament which is catalytically inactive, the gas to be tested being passed over both filaments. In another embodiment the gas is passed over only the testing filament, a similar compensator filament being exposed only to pure air, as by being sealed in a tube containing such air. The invention is applicable generally to such types of apparatus.

One prior practice has been to connect the testing and compensator filaments in series as one branch of the Wheatstone bridge circuit. Inasmuch as the compensator is similar in electrical characteristics to the testing filament, the potential drop across the bridge will be approximately twice the testing filament voltage. This condition has engendered disadvantages in previously known gas testing methods and apparatus of the general type contemplated. Thus, the voltage available from a dry cell constantly decreases during its operating period. The operating life of a battery of dry cells used in supplying electric current to the bridge circuit of a combustible gas indicator will be terminated when the voltage of the battery drops to the minimum operating potential of the bridge. The series connection of the testing and compensator elements used heretofore has consequently made it difficult to provide satisfactory combustible gas indicators of readily portable character. Thus, the minimum voltage at which a satisfactory detector filament can be made to operate is set by practical considerations. The filament must operate at a temperature high enough to induce combustion of all flammable vapors or gases that are likely to be encountered. With a platinum filament, the average filament temperature must be approximately 600° C. The filament must be long enough to give sufficient circuit sensitivity to allow the use of a sturdy and hence portable electrical meter. The required filament voltage may be reduced by increasing the wire diameter but this is at the expense of increased operating current, which in itself is undesirable in portable devices. In general, the operating voltage of the detector filaments of combustible gas indicators of this type is of the order of 1.0 volts, while the 0.8 volt at which the filament used in the instrument provided by this invention operates is near the lowest limit practically obtainable.

The open circuit potential of a new dry cell is approximately 1.5 volts. Under load conditions the terminal potential gradually drops until the break or end point is reached. At this point, the cell potential drops rapidly and the cell is unsuitable for further service. The terminal voltage at the break depends upon such factors as the rate of discharge and the type of material used in the cell, but for the current loads generally imposed by combustible gas indicators the end of the useful cell life will lie between 1.10 and 1.00 volts. The circuit must therefore be designed to operate with cells down to this end point if reasonable cell economy is to be had.

In the prior practice in which the detector, or testing, filament has been connected in series with a compensator filament similar in electrical characteristics to the detector filament, the minimum potential at which the bridge circuit will operate is, as noted above, twice the testing filament potential. This sets the minimum practical operating potential of the bridge at a value not far from 1.6 volts. It is obvious that such a circuit can not be operated from a single dry cell or from single cells connected in parallel. At least two series connected cells or series connected banks of parallel cells would be required. If it were possible to reduce the circuit voltage to a value of the order of 1.0 volt without increasing the circuit current, the number of dry cells required to satisfactorily operate the circuit could be cut in half.

A second practice that has been used in the past is to connect the compensating filament in a branch of the bridge circuit in parallel with the detector as related to the battery, and to use a compensator similar electrically to the detector. In such instruments the total bridge current is approximately twice the detector current. Practical considerations set the lower limit of detector current at approximately 0.50 ampere. At high discharge rates, doubling the current drain reduces the cell life to substantially one-third its original value. If, therefore, it were possible by means of such parallel arrangement of the bridge circuit to reduce the bridge voltage to a value low enough to use a single cell or a parallel bank of cells, the current consumption would be substantially doubled and the service life per cell reloading would be reduced to a value between one-half and one-third its value in the series connected bridge. Hence while the modified bridge would require half as many cells, the service life per cell would be less, because of increased current drain, than in an instrument of conventional design. The life per cell could only be restored to its series connection value by increasing the number of cells in the power supply.

Another disadvantage of prior apparatus of the type under discussion is that two adjustments have been necessary with such circuits. For example, it has been necessary to provide one rheostat for adjusting the testing filament voltage to the proper operating value, which is necessary each time the apparatus is used in intermittent operation, or at frequent intervals during continuous use, and likewise to provide a second rheostat for adjusting the balance of the circuit to zero setting. Consequently, the previously used circuits have required two rheostats for the two adjustments.

One of the features of this invention is the substantial reduction of the minimum operating potential of the bridge through the use of parallelly connected detector and compensator filaments without the previously attendant disadvantage of parallel operation, namely, a marked increase of the operating current of the measuring circuit with attendant marked decrease in battery life. The circuit provided by the present invention, by which such and other features are attained, comprises a Wheatstone bridge circuit having the detector filament in one branch and a dissimilar compensator element of much higher resistance in another bridge arm in parallel with the detector with respect to the battery. This allows the compensator to operate at the potential of the detector, limits the compensator current to a small fraction of the detector current, greatly increases battery life, provides the desired degree of circuit stability, permits simultaneous adjustment of zero setting and detector voltage, and affords other material and novel advantages as will appear hereinafter.

The term circuit stabilization as used herein refers to the reduction of the variation of the circuit balance with variation of the applied bridge potential. In any Wheatstone bridge circuit in which the detector filament and the compensator element are in parallel complete stabilization would result if the rates of variation of the resistances of the detector and compensator with their applied voltage were in exact proportion to the absolute magnitude of those resistances, i. e., if $$\frac{\frac{dR_c}{dV}}{\frac{dR_d}{dV}} = \frac{R_c}{R_d}$$

where $R_c$ and $R_d$ are the resistances of, respectively, the compensator and the detector, and $V$ is the applied voltage.

Complete stabilization would mean, however, that the circuit would remain balanced for all values of applied voltage. That is, if the circuit were off-balance it would remain in substantially the same degree off-balance for all applied voltages. If a single rheostat is used to control the current to the bridge, and hence the potential drop across the bridge, then the bridge, if balanced, will remain balanced for all positions of the control rheostat, or if unbalanced the indication of the meter will be proportional to the bridge voltage and a balance can never be established by this voltage control alone. However, only one position of such a control rheostat represents the correct operating voltage for a given battery condition, but there is no visible indication of that correct position for the reason just stated. In a completely stabilized bridge, therefore, there must be an additional control to adjust the circuit to the required balanced condition, and there must be either an additional meter to indicate the correct circuit operating potential or some switching arrangement must be provided so that the indicating meter can be used for both purposes.

The compensator element used in the practice of this invention to confer stability upon the circuit in use is one whose resistance varies with the applied voltage and whose voltage-current characteristics proportionately approximate those of the testing filament. A compensator element whose characteristics approach those of the testing filament sufficiently to provide the desired stability may be supplied appropriately through a resistance of the type exemplified by an incandescent lamp. Such a lamp may be used as the compensator element but for many purposes it is preferred to use a fixed resistance in parallel with a lamp of the type mentioned. A fixed resistance alone does not suffice as the compensator element because of the great variation in the zero setting of the circuit with changes in applied current, making it difficult to balance the bridge, or if balanced to maintain it in balance for more than extremely short periods of time. However, by the use of a fixed resistance together with a lamp of the type described, which acts as a ballast element, the desired circuit stability is obtained readily.

Such use of a fixed resistance in parallel with the resistor whose resistance varies with the applied voltage to form, in combination, the compensating element of the bridge, produces a resulting element whose over-all rate of variation of resistance with applied voltage is proportionately less than that of the variable element itself. In this way, the rate of variation of the compensator element can be reduced or controlled to any desired value. This reduction of the proportionate rate of variation of resistance of the stabilizing element may be accomplished by a fixed resistor connected in series with the stabilizing element in the compensator arm of the bridge. By extension, any combination of fixed resistors connected in series and parallel with the stabilizing element in the compensator arm can be used to produce the desired degree of over-all bridge stability.

Such a circuit is shown schematically in Fig. 1. This circuit comprises a testing filament 1 of electrical characteristics appropriate to the use to which it is to be put. Filament 1 is connected, preferably in series with a fixed resistance 2, to form one branch of a Wheatstone bridge circuit. The other branch of the circuit shown comprises a compensator element and a second fixed resistance 3 in series with each other. In the embodiment shown the compensator element comprises a parallel combination of a stabilizing resistance 5 in parallel with resistance 4 connected in series with a fixed resistance 3.

The compensator element is, in accordance with the invention, designed to have a resistance which is high in comparison with that of the testing filament 1 for current economy and so that the current requirements of the bridge are identical with or similar to those of the bridges previously used in which the detector, or testing, and compensator elements were connected in series. Greater sensitivity may be had by making the resistance of the compensator equal to that of the testing filament, but for most purposes such sensitivity is not needed. Resistor 4 or the stabilizing resistor 5 may be changed as need be to adjust the over-all resistance-voltage characteristics of their combination and hence the bridge stability. Resistor 5 suitably takes the form of a lamp such as described hereinabove. As indicated above, the compensator may consist alone of a lamp of suitable characteristics.

Reference has been made hereinabove to the use of a compensator element whose resistance variations are approximately proportional to those of the detector in the same ratio as the magnitudes of the resistances of these elements are proportional. In a particular case the over-all resistance of the parallel combination comprising the compensator element may be ten times as great as the resistance of the detector element at a given applied voltage. If, as a result of a small voltage reduction, the resistance of the detector element decreases 0.1 ohm, the resistance of the compensating element in a fully stabilized circuit would be required to decrease 1.0 ohm. But since absolutely proportionate resistance variations of the compensator and detector elements are inapplicable, the change in the compensator resistance resulting from the assumed drop in supply voltage, used in practicing the invention would approximate, but not equal, 1.0 ohm. If the net change in the over-all resistance of the compensator element is slightly greater than the 1.0 ohm value used in the illustration, the balance of the bridge will be disturbed in such a way that the meter pointer will move up scale as the bridge voltage is decreased. A net change in the over-all resistance of the compensator element slightly less than the 1.0 ohm stabilized value would result in a downward motion of the meter pointer with decreasing circuit voltage. Both cases are applicable in practice.

The degree to which the variation of the compensator resistance resulting from a small change of circuit voltage should approximate the value required for complete stabilization depends upon the particular application. If the instrument is to be used in a condition in which the balance, once established, must remain fixed for a long period of time, the stabilization condition should be closely approximated. Close approximation to the stabilized condition necessarily implies small changes of the circuit balance indicating meter will result from relatively larger changes of the applied circuit voltage. The degree of precision with which the detector voltage can be set is, therefore, limited. Where great precision of setting of the detector voltage is required, the deviation from the stabilized condition of the bridge should be increased.

The bridge includes also the customary indicating meter 6 connected at 7 and 7a to the two branches of the bridge as customary in Wheatstone bridge circuits, a source of current 8, and a rheostat 9 for adjusting the testing filament voltage.

In prior circuits the resistance in series with the testing filament has had to serve a circuit stabilizing function, which has necessarily fixed its electrical characteristics. In accordance with the present invention the resistor in series with the testing filament is relieved of the restricting limitations placed upon it by stabilizing requirements, wherefor its resistance may be reduced. The lower limit of resistor 2 is fixed only by the maximum sensitivity required of the circuit. Values as low as one-third to one-fifth the resistance of the detector 1 are entirely feasible and useful for many purposes, and the voltage drop across the fixed resistor and testing filament will be correspondingly diminished. The total bridge voltage will therefore be reduced, as compared with prior practice, to something slightly more than one-half of its previous value. This allows the batteries to be used to a much lower terminal voltage, thus increasing their useful life. For instance, experience has shown that for work of this class dry cells operate satisfactorily down to a voltage of about 1 volt, but thereafter the batteries rapidly become depleted. By reducing the resistance of resistor 2 the total drop across the bridge is reduced, as compared with prior circuits, so that the batteries can be used to a lower terminal value and therefore for longer periods of time than heretofore. Experience has shown that this drop in operating voltage of the bridge affords as much as 100 to 150 per cent increase of battery life. In one indicator constructed in accordance with this invention and using No. 2 dry cells the battery life was increased so that the batteries operated from 1 to 1½ hours longer than the same batteries in prior art circuits. In an indicator using No. 6 dry cells the increase would be from 10 hours to 20 or 25 hours. The importance of this great increase in battery life is particularly evident when consideration is given to the use of these indicators in, for instance, mines and under similar conditions of field use.

In the circuit shown in Fig. 1 and through the use of a compensator element of the type and connected as described hereinabove, the stability of the circuit is such that circuit balance and the testing filament current may be adjusted simultaneously by the adjustment of rheostat 9, the proper relations between the factors of circuit balance and detector current being obtained through the use of this compensator element. An apparatus embodying such a circuit in which the compensator consists of a fixed resistance and a ballast lamp in parallel with each other is shown in Figs. 2 to 5.

The apparatus comprises a case 10 of nonconducting material divided by a partition 11 into two compartments. In the upper compartment there is mounted a combustion cell 12 connected by a conduit 13 to a gas inlet fitting 14 and by a conduit 15 to a pump 16 for drawing gas to be tested through the combustion cell. The pump is operated by a handle member 17 provided with a spring latch member 18 for holding the plunger in depressed position when the apparatus is not in use.

Mounted within combustion cell 12 for contact with gas passed therethrough is a filament 19 which acts as the testing filament. As is customary, this filament is adapted to cause combustion of combustible constituents in gas passed through the cell. Suitably it is of platinum treated to cause it to be catalytically active to cause combustion when the filament is at operating temperature. The filament is preferably mounted within a foraminous cup member 20, suitably formed of fine mesh wire gauze, to protect the filament during handling, shipment, and installation. As may be seen from Fig. 4, the filament and cup 20 are carried by a cover member 21 provided with screw threads for cooperation with similar threads formed in the body of the cell. The gas inlet and outlet 22 and 23 formed in the bottom of the body of the cup are provided with flash-back arresters 24 of conventional type, for instance, tightly coiled wire gauze.

Testing filament 19 forms part of a Wheatstone bridge circuit, shown in Fig. 3, which includes also a fixed resistor 25 in series with the testing filament, the two forming one branch of the bridge. The other branch is made up of a fixed resistance 26 in series with the compensator element which in the embodiment shown comprises a fixed resistor 27 and a ballast lamp 28 in parallel therewith.

The bridge is supplied with current from a battery 29 comprising a pair of dry cells connected in parallel and to the bridge by leads 30 and 31. A rheostat 32 operable by a knob 32a is connected in the circuit and in consequence of the characteristics of this circuit this rheostat permits simultaneous adjustment of the circuit balance and the detector voltage. A meter 33, such as a milliammeter, is connected between terminals 34 and 35 of the bridge.

The ballast lamp is mounted in a socket 36 provided with a tongue member 37 connected by a screw 38 to a boss 39 integral with the case. The combustion cell 12 is similarly mounted to a boss through a tongue member 40 and a screw 41, and the pump is similarly held in position by straps 42 connected by screws 43 to similar bosses.

The lower compartment of the case is of such size as to receive the battery. In the embodiment shown this comprises a pair of F-size dry cells 44. The positive terminals 45 of the cells press against contacts 46 connected to a buss 47 fastened to partition member 11 which point provides a terminal for connecting lead 31 to rheostat 32 and thence through a lead 48 to the circuit, as shown in Fig. 3. The negative terminals of the batteries press against contacts 49 connected to a buss 50 which is in turn fastened to the partition member and provides a terminal for connecting lead 30 to the circuit as shown in Fig. 3.

The case is provided with a rear cover 51 which is connected by a nut 52 rotatably carried by the cover for engagement with a screw member 53 molded into partition 11.

Testing element 19 is connected by leads 54 and 55 to terminals 56 and 57 mounted in the top of cover 21.

Gas inlet member 14 is provided with a nipple 58 for connection to a flexible sampling line so that the device may be used in a given atmosphere without the sampling line, or through attachment of the sampling line may draw gas sample from any desired point.

The scale of meter 33 may be graduated as desired, for instance in terms of the percentage of the lower explosive limit.

As an example of the practice of the invention, an apparatus like that just described may be used to determine the per cent explosibility, in terms of the lower explosive limit, of flammable gases and vapors mixed with air by using two No. F dry cells in parallel and a bridge as follows. The testing filament 19 comprises 15 turns of 2 mil platinum wire coiled on a 5 mil mandrel; such a filament will have a resistance of 1.4 ohms at 0.5 ampere. The fixed resistor 25 in series therewith has a resistance of 0.58 ohm. The compensator includes a fixed resistance 27 of 26 ohms, and, in parallel, a ballast lamp having a resistance of 25.2±0.2 ohm at 0.8 volt. Fixed resistor 26 has a resistance of 5 ohms. Rheostat 32 is suitably of 1 ohm resistance.

In the use of this device the circuit is first balanced in pure air, i. e., air free from combustible gases and vapors. To this end pump 16 is operated to draw pure air through the combustion cell. When a sufficient amount of air to flush the combustion chamber has been drawn therethrough rheostat 32 is adjusted to bring the meter pointer to its zero setting. When the instrument has been balanced the pump is operated to draw gas sample through the combustion cell until the highest reading on the meter is obtained. With a pump of adequate capacity this will generally take about ten pump strokes if no sampling line is used, while a number of additional strokes will be necessary, depending upon the size and length of the sample line where one is used. With a meter scale graduated in percentage of the lower explosive limit, the reading thus obtained will indicate how closely the atmosphere approaches the minimum concentration required for explosion.

If in making a test the meter pointer is deflected to the extreme right of the scale and remains there, the atmosphere under test is explosive. Should the meter pointer move rapidly across the scale and with continued aspiration return quickly to a position in the scale range or below zero, it is an indication that the concentration of flammable gases or vapors may be above the upper explosive limit. To verify this fresh air is immediately aspirated through the sampling line, or directly into the indicator. Then, if the meter pointer moves first to the right and then to the left of the scale, it is an indication that the concentration of flammable gas or vapor in the sample is above the upper explosive limit. When it is necessary to estimate the concentration of combustible gas or vapor above the lower explosive limit, the sampling line may be provided with a dilution valve through which the sample is diluted with a fixed, known proportion of fresh air. By applying the proper factor to the meter reading the concentration is thus directly determinable.

When it is not possible to adjust the apparatus in pure air, satisfactory adjustment may be obtained after making a test by discontinuing the operation of the pump while permitting the combustible content of the sample within the combustion chamber to burn out by contact with the heated detector filament. This will ordinarily occur in a few minutes' time, and during this interval, with the pump not operated, the rheostat is adjusted at brief intervals, say, one minute, until the meter pointer rests at zero. In this manner the filament will be heated sufficiently to burn out the combustibles and give a zero adjustment equivalent to that made in fresh air.

A feature of this device shown in Figs. 2 and 4 lies in a novel flow system which in simple and inexpensive manner achieves flow through the combustion cell with elimination or minimizing of certain disadvantages encountered in the construction and use of such elements. In combustible gas indicators of the heated filament type it is desirable to have the sample pass through the cell so that portions of the sample which have been burned by contact with the filament are continuously replenished. However, this flow must take place in such manner that no appreciable cooling of the filament is produced because such cooling would affect the circuit balance and cause the instrument reading to fluctuate with varying rates of flow. This is particularly objectionable in an instrument in which a piston-type pump, producing a pulsating flow, is used. One mode of obtaining acceptable performance under such conditions is to use a small rate of sample flow. This is undesirable in most instances, however, because of the long time required to operate an indicator with a long sampling line, and because of the influence of absorption of the combustible material by the sampling line. On the other hand, the rate of flow over the detector filament must be such as to permit burning of the flammable gas or vapor, but with greater rates of sample flow the actual velocity of the sample over the filament may be reduced to a satisfactory value by enlarging the combustion chamber. This is undesirable, however, because the time of sampling and the time required to clear the chamber of combustible matter, e. g., by contact with the detector filament, is greatly increased, and because the apparatus is thus rendered bulkier and heavier.

To overcome these disadvantages the combustion cell of this invention is adapted to by-pass a portion of the gas entering through inlet 22 directly to outlet 23 by associating a baffle therewith to permit part of the sample to flow through the chamber and the rest to pass directly to the outlet. In the embodiment of Fig. 4 the inlet 22 and outlet 23 lie in the same plane and are covered by a metallic disc 59 held in place by a screw 60. Disc 59 is very nearly of the same diameter as the interior of the cell, and it is spaced above the inlet and outlet ports a distance such as to permit a portion of the gas entering inlet 22 to flow through the chamber and into contact with the testing element at the desired rate, and thence to outlet port 23, the remainder of the gas flowing directly under disc 59 to outlet 23. The proper spacing can be obtained by designing the boss which receives pin 60 to be of such height that disc 59 is thereby spaced over the inlet and outlet ports a distance which provides the proper proportionate flow as just described. Or pins 61 may be disposed in the flash-back arresters 24 to accomplish the same end, and in this manner the disc spacing is adjustable by variation of the pin length.

It will be understood that various changes are permissible without departing from the invention. Thus, one or both of the flash-back arresters may be included in the battery circuit. The advantage of such a modification is that occasionally the arresters must be cleaned, and if an operator neglects to return one or both there is danger of fire or explosion when the instrument is operated. Such danger is avoided by including the arresters in the battery circuit, as in line 31 because then filament 19 can not be heated unless the arresters are in place.

This is a continuation-in-part of my copending application Serial No. 223,877, filed August 9, 1938.

According to the provisions of the patent statutes, I have explained the principle and mode of operation of my invention, and have illustrated and described what I now consider to represent its best embodiments. However, I desire to have it understood that, within the scope of the appended claims, the invention may be practiced otherwise than as specifically illustrated and described.

I claim:

1. Gas testing apparatus comprising a combustion chamber provided with inlet and outlet ports for gas to be tested, means for causing gas to flow through said chamber, a catalytically active testing filament disposed in said chamber for contact with gas passed therethrough, a Wheatstone bridge circuit including said filament in one branch, and in the other branch in parallel with said filament a compensating circuit-stabilizing element comprising a fixed resistance and in parallel therewith a resistor whose resistance is a function of the applied voltage, the ratio of the variation of resistance of said filament to that of said compensating element for a given variation of the common potential applied to them approximating, but not equaling, the ratio of the absolute magnitudes of said filament and compensating element resistances, means associated with said circuit for indicating flow of current therein, a rheostat for simultaneously adjusting the circuit balance and the filament voltage, and a source of electric current connected to said bridge.

2. Gas testing apparatus comprising a combustion chamber provided with inlet and outlet ports for gas to be tested, means for causing gas to flow through said chamber, a catalytically active testing filament disposed in said chamber for contact with gas passed therethrough, a Wheatstone bridge circuit including said filament in one branch, and in the other branch in parallel with said filament a compensating circuit-stabilizing element whose resistance is high compared with that of said filament, the ratio of the variation of resistance of said filament to that of said compensating element for a given variation of the common potential applied to them approximating, but not equaling, the ratio of the absolute magnitudes of said filament and compensating element resistances, means associated with said circuit for indicating flow of current therein, a rheostat for simultaneously adjusting the circuit balance and the filament voltage, and a source of electric current connected to said bridge.

3. Gas testing apparatus comprising a combustion chamber provided with inlet and outlet ports for gas to be tested, a baffle member associated with the interior of said chamber covering and spaced from said ports a distance such as to permit a portion of gas entering through said inlet to flow through the chamber over said filament, and the remainder to pass directly to said outlet port, means for causing gas to flow through said chamber, a catalytically active testing filament disposed in said chamber for contact with gas passed therethrough, a Wheatstone bridge circuit including said filament in one branch, and in the other branch in parallel with said filament a compensating circuit-stabilizing element, the ratio of the variation of resistance of said filament to that of said compensating element for a given variation of the common potential applied to them approximating, but not equaling, the ratio of the absolute magnitudes of said filament and compensating element resistances, means associated with said circuit for indicating flow of current therein, a rheostat for simultaneously adjusting the circuit balance and the filament voltage, and a source of electric current connected to said bridge.

4. Gas testing apparatus comprising a combustion chamber provided with inlet and outlet ports for gas to be tested, a baffle member associated with the interior of said chamber covering and spaced from said ports a distance such as to permit a portion of gas entering through said inlet to flow through the chamber over said filament, and the remainder to pass directly to said outlet port, means for causing gas to flow through said chamber, a catalytically active testing filament disposed in said chamber for contact with gas passed therethrough, a Wheatstone bridge circuit including said filament in one branch, and in the other branch in parallel with said filament a compensating circuit-stabilizing element comprising a fixed resistance and in parallel therewith a resistor whose resistance is a function of the applied voltage, the ratio of the variation of resistance of said filament to that of said compensating element for a given variation of the common potential applied to them approximating, but not equaling, the ratio of the absolute magnitudes of said filament and compensating element resistances, means associated with said circuit for indicating flow of current therein, a rheostat for simultaneously adjusting the circuit balance and the filament voltage, and a source of electric current connected to said bridge.

5. Gas testing apparatus comprising a combustion chamber provided with inlet and outlet ports for gas to be tested, means for causing gas to flow through said chamber, a catalytically active testing filament disposed in said chamber for contact with gas passed therethrough, a Wheatstone bridge circuit including said filament in one branch, and in the other branch in parallel with said filament a compensating circuit-stabilizing element comprising a fixed resistance connected to a resistor whose resistance is a function of the applied voltage, the ratio of the variation of resistance of said filament to that of said compensating element for a given variation of the common potential applied to them approximating, but not equaling, the ratio of the absolute magnitudes of said filament and compensating element resistances, means associated with said circuit for indicating flow of current therein, a rheostat for simultaneously adjusting the circuit balance and the filament voltage, and a source of electric current connected to said bridge.

RALPH E. HARTLINE.